US009008679B2

(12) United States Patent
Lee

(10) Patent No.: US 9,008,679 B2
(45) Date of Patent: Apr. 14, 2015

(54) COMMUNICATION SYSTEM, METHOD FOR THE SAME AND MOBILE STATION AND BASE STATION USED FOR THE SAME

(75) Inventor: Jinsock Lee, Tokyo (JP)

(73) Assignee: Lennovo Innovations Limited (Hong Kong), Quarry Bay (HK)

( * ) Notice: Subject to any disclaimer, the term of this patent is extended or adjusted under 35 U.S.C. 154(b) by 534 days.

(21) Appl. No.: 11/753,772

(22) Filed: May 25, 2007

(65) Prior Publication Data

US 2007/0293230 A1 Dec. 20, 2007

(30) Foreign Application Priority Data

Jun. 14, 2006 (JP) .................................. 2006-164791

(51) Int. Cl.
H04W 72/08 (2009.01)
H04W 72/04 (2009.01)

(52) U.S. Cl.
CPC ........ *H04W 72/085* (2013.01); *H04W 72/0413* (2013.01); *H04W 72/082* (2013.01)

(58) Field of Classification Search
CPC ..... H04L 1/0026; H04L 5/006; H04L 5/0007; H04L 5/0053; H04L 5/0057; H04L 5/0096; H04L 5/0098
USPC ......... 370/320, 338–329, 331–335, 338–341; 455/450–453, 509, 560–561, 437
See application file for complete search history.

(56) References Cited

U.S. PATENT DOCUMENTS

| 5,239,676 A | * | 8/1993 | Strawczynski et al. ........ 455/437 |
| 5,987,326 A | * | 11/1999 | Tiedemann et al. .......... 455/442 |
| 7,046,644 B1 | * | 5/2006 | Lappetelainen .............. 370/329 |
| 7,457,588 B2 | * | 11/2008 | Love et al. ................. 455/67.11 |
| 2001/0053139 A1 | * | 12/2001 | Zimmermann et al. ....... 370/332 |
| 2004/0203979 A1 | * | 10/2004 | Attar et al. ..................... 455/522 |
| 2005/0085190 A1 | * | 4/2005 | Nishikawa ................... 455/63.1 |
| 2005/0201295 A1 | * | 9/2005 | Kim et al. ...................... 370/241 |
| 2005/0271009 A1 | * | 12/2005 | Shirakabe et al. ............ 370/329 |
| 2006/0245407 A1 | * | 11/2006 | Chen et al. .................... 370/338 |

FOREIGN PATENT DOCUMENTS

| EP | 1 575 234 | 9/2005 |
| JP | 2004-208234 | 7/2004 |
| JP | 2004-537875 | 12/2004 |
| JP | 2005-160079 | 6/2005 |
| JP | 2006-050545 | 2/2006 |

OTHER PUBLICATIONS

3GPP TSG RAN, TR25.814 ver. 1.2.0, "Physical Layer Aspects for Evolved UTRA", Feb. 2006.

(Continued)

*Primary Examiner* — Vladimir Magloire
*Assistant Examiner* — Erica Navar

(57) ABSTRACT

The present invention enables a high load to a mobile station and an uplink overhead to be reduced when a CQI measurement of a PRB needed for scheduling or adaptive modulation is informed of. At a base station, a set of PRBs (an active set) for which the measurements of CQIs are to be informed of is decided for each mobile station. Each mobile station measures only CQIs of the PRBs that form the active set designated by the base station and informs the base station of the measurements. That can reduce the load on the mobile station and also reduce the amount of information for informing the CQIs, thus, the uplink overhead can be also reduced.

37 Claims, 12 Drawing Sheets

(56) References Cited

OTHER PUBLICATIONS

3GPP TSG RAN, TR25.814 ver. 1.2.3, "Physical Layer Measurements ", May 2006.

European Patent Office issued an European Search Report dated Jul. 8, 2009, Application No. 07106793.8.

Japanese Office Action dated May 17, 2011 in corresponding Japanese Application No. 2006-164791 with English translation of enclosed wavy line portions.

* cited by examiner

COMMUNICATION SYSTEM, METHOD FOR THE SAME AND MOBILE STATION AND BASE STATION USED FOR THE SAME

BACKGROUND OF THE INVENTION

1. Field of the Invention

The present invention relates to a communication system and a communication method for the same and a mobile station and a base station used for the same, and more specifically, to a communication channel quality informing system for informing a downlink communication channel quality of a plurality of different bands in downlink packet communication using a shared channel in a mobile communication system.

2. Description of the Prior Art

As a packet communication system for performing a communication in which a plurality of mobile stations share a radio band, a HSDPA (High Speed Downlink Packet Access) or a LTE (Long Term Evolution) that are standardized with the 3GPP ($3^{rd}$ Generation Partnership) are known. In such a packet communication system, the mobile station measures the receiving quality of a common pilot channel transmitted in a downlink (CPICH) and informs a base station of the measurement via an uplink as a communication channel quality (CQI: Channel Quality Indicator).

Correspondence between the receiving quality and the CQI is decided in advance and a plurality levels of CQIs are defined in the HSDPA. The base station uses the CQI informed from the mobile station for packet scheduling for performing allocation of occasion of transmitting packets and adaptive modulation for changing a modulating method and a coding rate for the communication channel coding. By using the communication channel quality in such a manner, a communication can be provided according to the communication channel for each mobile station; thus, a radio communication band can be efficiently used.

For the access system in the downlink of the LTE, the OFDM (Orthogonal Frequency Division Multiplexing) method is examined. In the OFDM method, a scheduler in the base station performs scheduling for allocating frequencies and time resources to mobile stations that are users in a cell to make the most of wireless capacity of the cell of the base station.

Specifically, a frequency division multiplex is realized as a wireless communication band allocated to the system is divided into a plurality of small wireless bands (PRB: Physical Resource Block) and mobile stations are allocated to the PRBs. It is assumed that relationship between the communication band of the system and the PRB is such as shown in FIG. 13. It is also assumed that the communication band of the system is divided into PRBs by the number of 24 in total of 0L to 11L and 0R to 11R.

As an example of a state of allocating frequency resources at a certain time by the above-mentioned scheduling at the base station, a mobile station (UE: User Equipment) 1 is allocated to PRBs 5L to 11L, a mobile station 2 is allocated to PRBs 0L to 4L, 0R and 1R, a mobile station 3 is allocated to PRBs 2R to 5R, and a mobile station 4 is allocated to PRBs 6R to 11R, respectively, as shown in FIG. 13.

The base station needs to know a channel state, i.e., a communication channel quality (CQI) of each PRB in order to select and allocate the PRB suitable for a mobile station. Thus, the mobile station needs to measure the CQIs relating to all the PRBs as frequently as possible and inform the measurements to the base station.

The resource allocation and the notification of CQI relating to PRB are disclosed in 3GPP TSG RAN, TR25.814 ver. 1.2.0, "Physical Layer Aspects for Evolved UTRA", February 2006 and 3GPP TSG RAN, TR25.814 ver. 1.2.3, "Physical Layer Measurements", May 2006.

When each mobile station informs a base station of a CQI, it needs to receive a pilot signal of each PRB, perform channel estimation on each PRB and calculate the CQI from each of the estimated channel. Thus, there is a problem in that the mobile station is required high throughput resulting in a high-loaded state.

There is another problem in that the information causes significant overhead in uplink. If there are 24 PRBs requiring 100 times of information for each second and eight bits are required for informing a CQI of one PRB, the required total bit rate in uplink is 24×100×8=19200 bits/second (bps). If there are 100 mobile stations in a cell, 100×19.2 kbps=1.92 Mbps is wasted on only informing a CQI for scheduling.

An object of the present invention is to provide a communication system, a communication method for the same and a mobile station and a base station used for the same, that can reduce a load on a mobile station or uplink overhead in informing the measurement of CQI of PRB required for scheduling or adaptive modulation.

BRIEF SUMMARY OF THE INVENTION

A communication system according to the present invention is a communication system in which a mobile station measures a communication channel quality of a band obtained by dividing a downlink communication band into a plurality of bands and informs a base station of the measurement via an uplink, wherein said base station comprises set managing means for allocating a set of bands for requiring information on the communication channel quality to said mobile station.

A communication method according to the present invention is a communication method in which a mobile station measures a communication channel quality of a band obtained by dividing a downlink communication band into a plurality of bands and informs a base station of the measurement via an uplink, comprising in said base station, a set managing step of allocating a set of bands for requiring information on the communication channel quality to said mobile station.

A base station according to the present invention is a base station which is used in a mobile communication system in which a mobile station measures a communication channel quality of a band obtained by dividing a downlink communication band into a plurality of bands and informs said base station of the measurement via an uplink, comprising receiving means for receiving said measurement, and set managing means for allocating a set of bands for requiring information on the communication channel quality to the mobile station.

A mobile station according to the present invention is a mobile station for measuring a communication channel quality of a band obtained by dividing a downlink communication band into a plurality of bands and informing a base station of the measurement via an uplink, comprising means for measuring the communication channel quality of each band that forms a set of bands which is allocated by said base station and required to inform on the communication channel quality and informing said base station of the measurement.

A program according to the present invention is a program for causing a computer to execute operations of a base station which is used in a mobile communication system in which a mobile station measures a communication channel quality of a band obtained by dividing a downlink communication band into a plurality of bands informs said base station of the measurement via an uplink, comprising process of receiving said measurement, and process of allocating a set of bands for requiring information on the communication channel quality to said mobile station.

Another program according to the present invention is a program for causing a computer to execute mobile station's operations of measuring a communication channel quality of a band obtained by dividing a downlink communication band into a plurality of bands and informing a base station on the measurement via an uplink, comprising process of measuring the communication channel quality of each band that forms a set of the bands which is allocated by the base station and is required to be informed on the communication channel quality and informing said base station of the measurement.

DETAILED DESCRIPTION OF THE PREFERRED EMBODIMENTS

Figure 1:
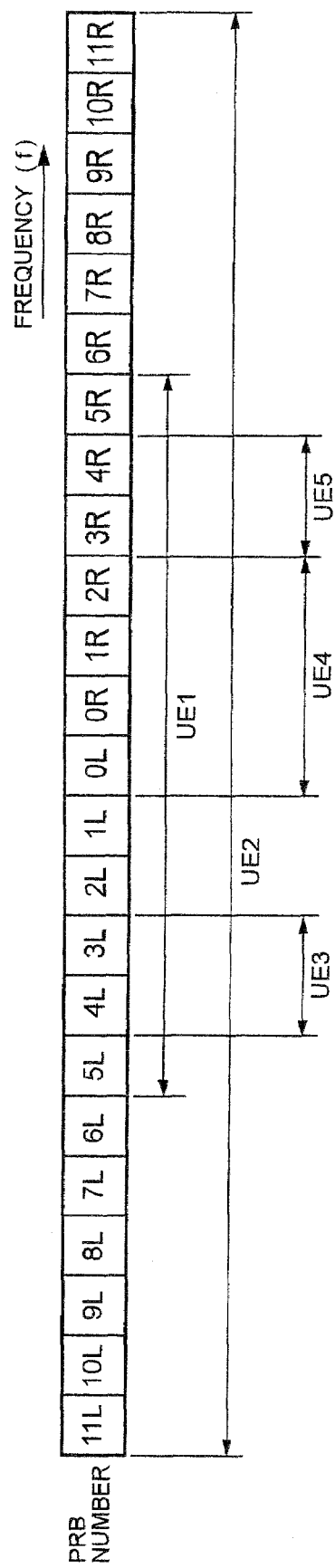
FIG. 1 is a diagram for illustrating the principle of the present invention, showing an example of an active set of PRBs of the present invention.

Embodiments of the present invention will be described below with reference to the drawings. Prior to the description, the principle of the present invention will be described with reference to FIG. 1. In the present invention, it is assumed that an active set of PRBs (a set consisting of PRBs which are selected by a base station and whose CQIs are requested to be informed of by the base station) is allocated to each of the mobile stations (UE) 1 to 4 as shown in FIG. 1.

That is to say, PRBs 0L to 5L and 0R to 5R are allocated to a mobile station 1 as the active set, PRBs 0L to 11L and 0R to 11R are allocated to a mobile station 2 as the active set, PRBs 3L to 4L are allocated to a mobile station 3 as the active set, PRBs 0L and 0R to 2R are allocated to a mobile station 4 as the active set and PRBs 3R to 4R are allocated to a mobile station 5 as the active set.

A base station decides the active set of PRBs and informs it to the mobile station, for example, at the beginning of establishing a call with a mobile station. Here, the term "establishing a call" means that the base station detects entering of a mobile station in the cell of the base station and connects the wireless channel with the mobile station. When the mobile station receives the active set of PRBs from the base station, it measures only the CQI of each PRB that forms the active set and transmits the CQI of each PRB in the active set. Therefore, the mobile station only needs to measure only the CQIs of the PRBs forming the active set and inform the measurements to the base station, so that a load on the mobile station is reduced, which can also reduce the uplink overhead.

The example of FIG. 1 shows an active set of PRBs at a certain time. The active set of PRBs differs at a different time. The active set is not limited to be informed from the base station to the mobile station at the beginning of establishing a call, and it may be done at a predetermined time regularly or irregularly.

Figure 2A:
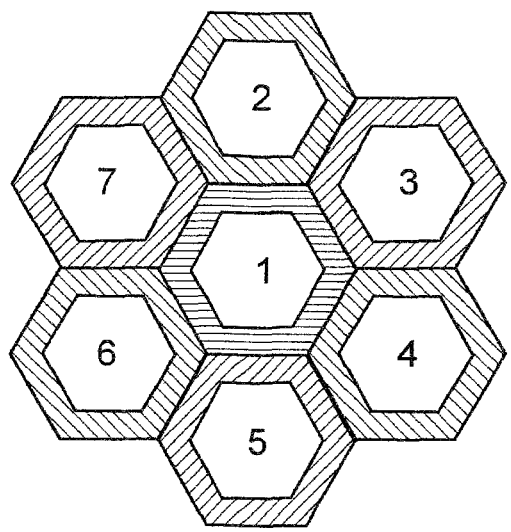
FIGS. 2A and 2B are diagrams for illustrating an embodiment of the present invention, showing a case where the frequency planning between adjacent base stations (cells) is used as an example of a configuration of the active set of the PRBs.
Figure 2B:
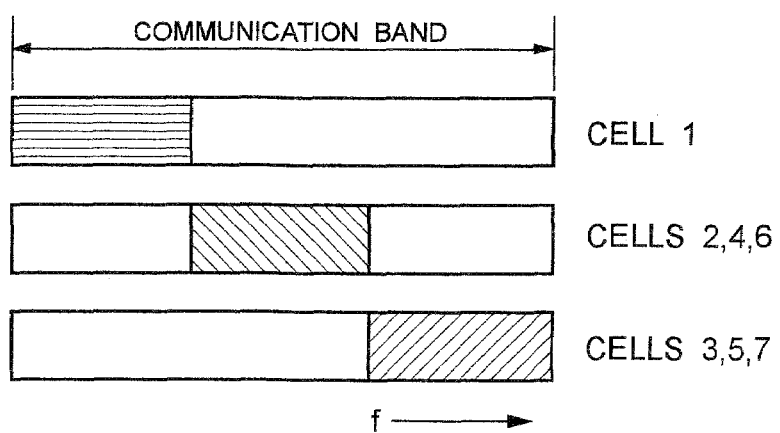

An embodiment of a configuration of an active set of PRBs will be described below. FIGS. 2A and 2B are diagrams for illustrating an embodiment of the present invention, showing a case where a frequency planning (plan for allocating frequency) between adjacent base stations (between cells) is used as an example of a configuration of the active set. It is assumed that cells 1 to 7 are arranged as shown in FIG. 2A. That is to say, the cell 1 is placed at the center, surrounded by the other cells 2 to 7 with adjacent cells contacting with each other.

In this case, a communication band is divided into three bands by ⅓ for each as shown in FIG. 2B, and the low band of them (shown by horizontal lines) is allocated at the edge of the cell 1 in the center, the central band of them (shown by downward-slanting lines) is allocated at each edge of the cells 2, 4, and 6, and the high band of them (shown by upward-slanting lines) is allocated at each edge of the cells 3, 5 and 7. Further, in the center part of each cell, all the communication bands are allocated.

Figure 3:
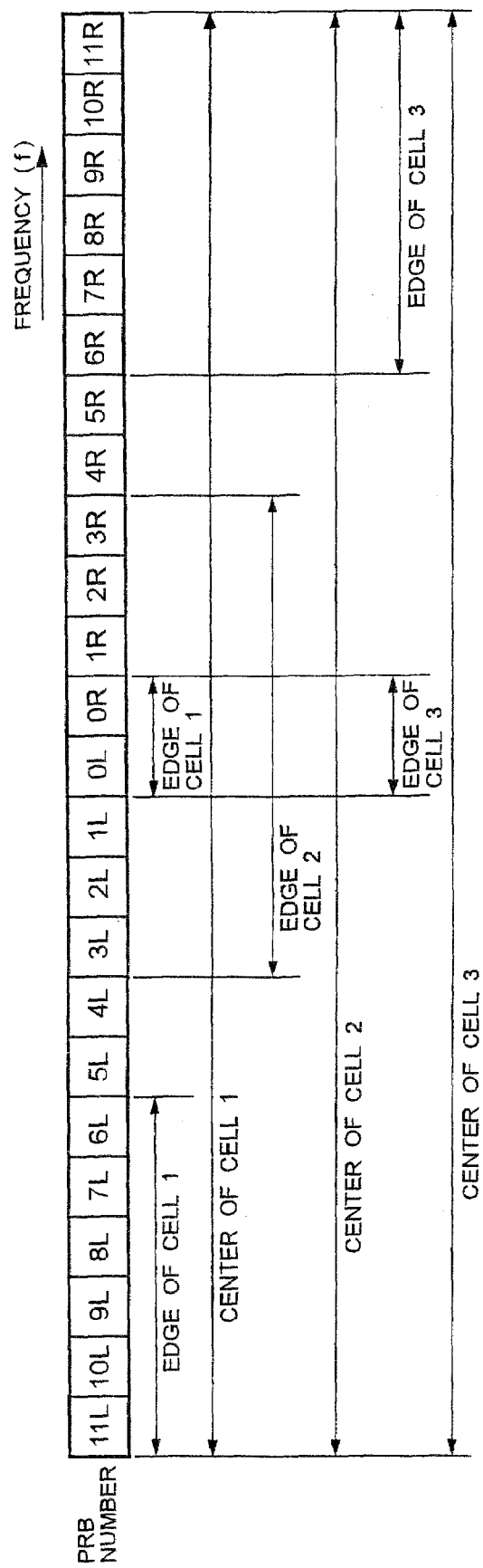
FIG. 3 is a diagram showing an example of specific allocation of the active set of PRBs based on the frequency planning by the embodiment of the present invention.

FIG. 3 shows allocation of a specific active set that is based on the frequency planning. PRBs 6L to 11L, 0L and 0R are allocated to the mobile station placed at the edge of the cell 1, PRBs 0L to 3L and 0R to 3R are allocated to the mobile station placed at the edge of the cell 2, and PRBs 6R to 11R, 0L and 0R are allocated to the mobile station placed at the edge of the cell 3. All the PRBs are allocated to the mobile stations placed at the center of each cell.

Actually, the central PRBs 0L and 0R of the communication band are included in the active set of PRBs for all the mobile stations whatever the center or edge is, as the central PRBs 0L and 0R are used as a shared control channel. That is based on restriction according to the specification of 3GPP. As the active set of the PRB is configured based on the frequency planning like this, interference between adjacent cells can be prevented, improving a scheduler.

Figure 4:
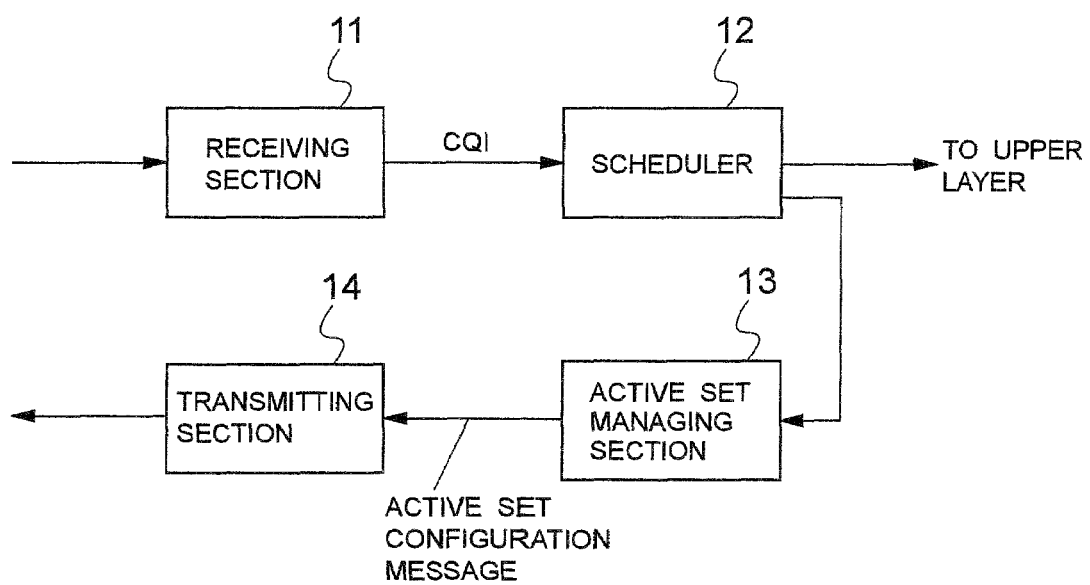
FIG. 4 is an outlined block diagram showing the base station in the embodiment of the present invention.
Figure 5:
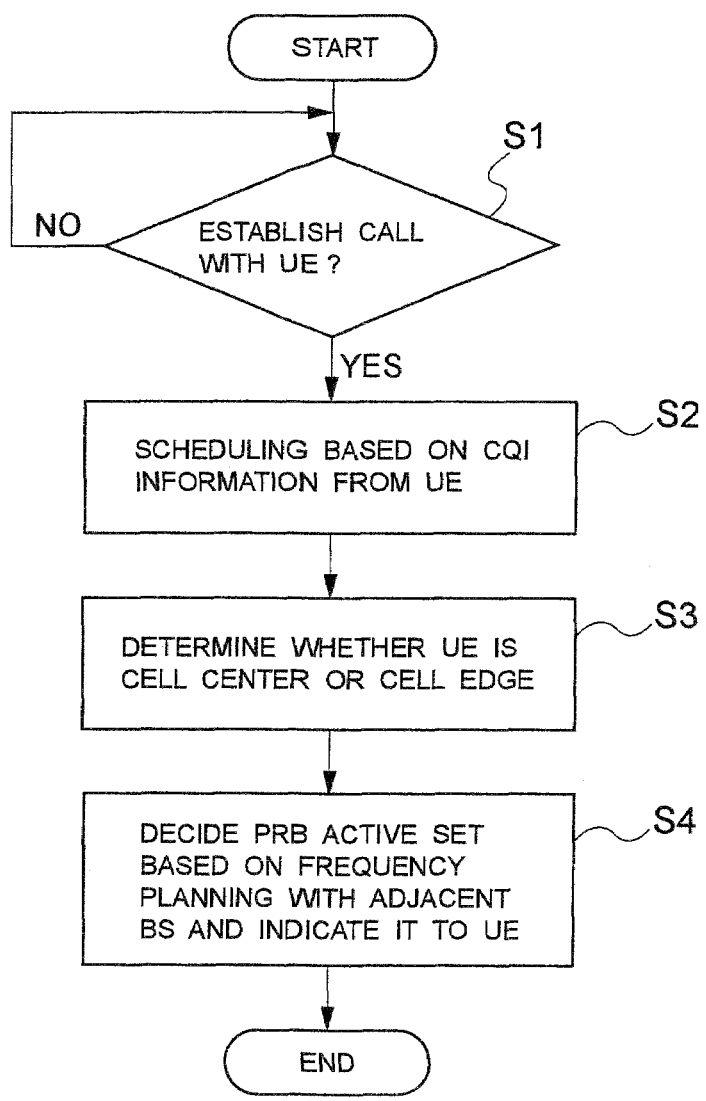
FIG. 5 is a flowchart showing operations of the base station in the embodiment of the present invention.

FIG. 4 is a block diagram showing outlined functions of the base station of the embodiment. The base station includes a receiving section 11, a scheduler 12, an active set managing section 13 and a transmitting section 14. FIG. 5 is a flowchart showing operations of the base station. The operations of the base station in FIG. 4 will be described with reference to FIG. 5.

When the base station established a call with a mobile station (step S1), an uplink signal from the mobile station is received by the receiving section 11, the CQI of the active set of the PRB which is informed of from the mobile station is extracted and supplied to the scheduler 12. At the scheduler 12, scheduling is performed to allocate frequency and time resources to mobile stations that are users in the cell with reference to the CQI of each PRB (step S2). Also determination on the position of a mobile station in the cell, i.e., whether the mobile station is placed at the cell center or at the cell edge is done (step S3). Based on the scheduling and the determination on the cell position, an active set of PRBs for each mobile station is decided at the active set managing section 13 and it is transmitted from the transmitting section 14 to each mobile station as a downlink signal (step S4).

Figure 6:
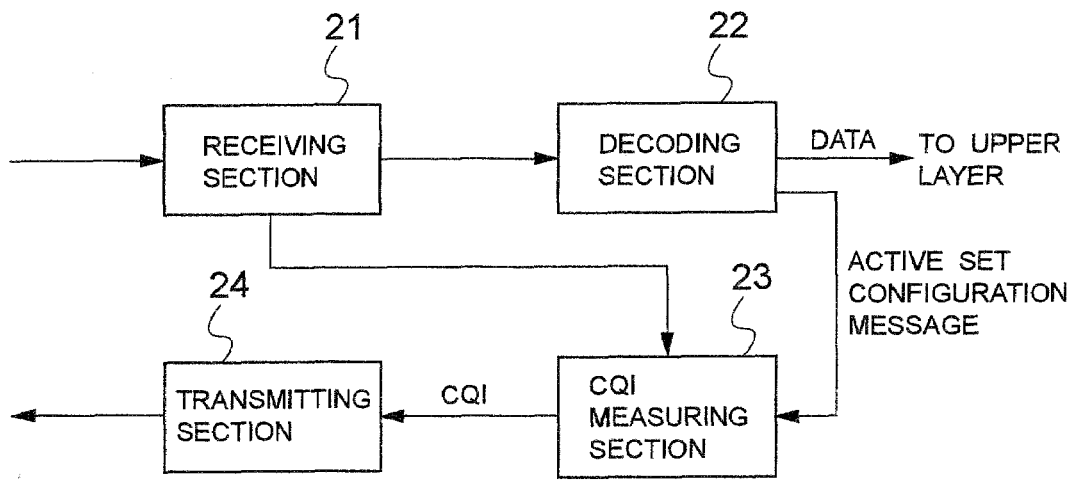
FIG. 6 is an outlined block diagram showing the mobile station in the embodiment of the present invention.
Figure 7:
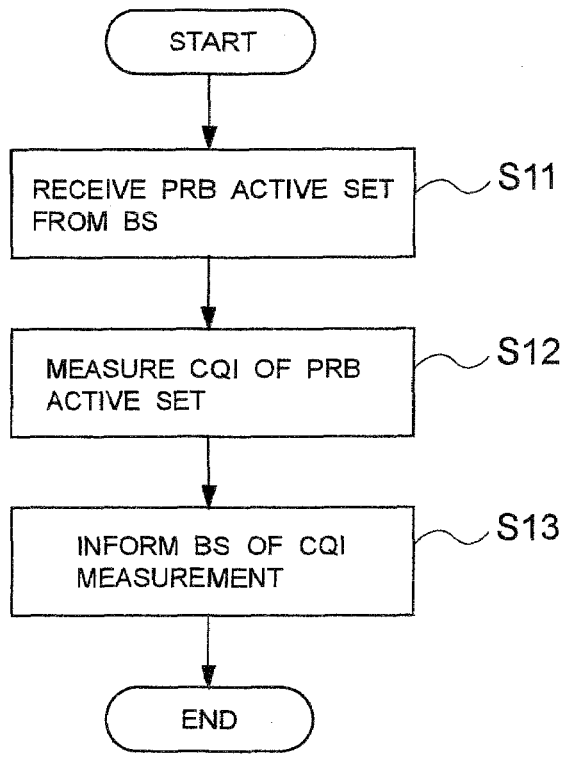
FIG. 7 is a flowchart showing operations of the mobile station in the embodiment of the present invention.

FIG. 6 is a block diagram showing outlined functions of the mobile station of the embodiment, including a receiving section 21, a decoding section 22, a CQI measuring section 23 and a transmitting section 24. FIG. 7 is a flowchart showing operations of the mobile station. The operations of the base station in FIG. 6 will be described with reference to FIG. 7.

A downlink signal from the base station is received at the receiving section 21, input in the decoding section 22 and decoded. The active set of PRBs from the base station is decoded at the decoding section 22 (step S11) and supplied to the CQI measuring section 23 as an active set configuration message. At the CQI measuring section 23, CQIs are measured only for the PRBs forming the active set of PRBs included in the message (step S12). The measurements are informed to the base station as an uplink signal via the transmitting section 24 (step S13).

Another embodiment of the present invention will be described. In the embodiment, an active set of PRBs decided in the abovementioned embodiment is not maintained during a call. The embodiment is adapted to change the active set, i.e., change (add/delete) PRBs forming the active set according to a request from the mobile station. Therefore, this embodiment is called as a mobile station supporting active set management.

Figure 8:
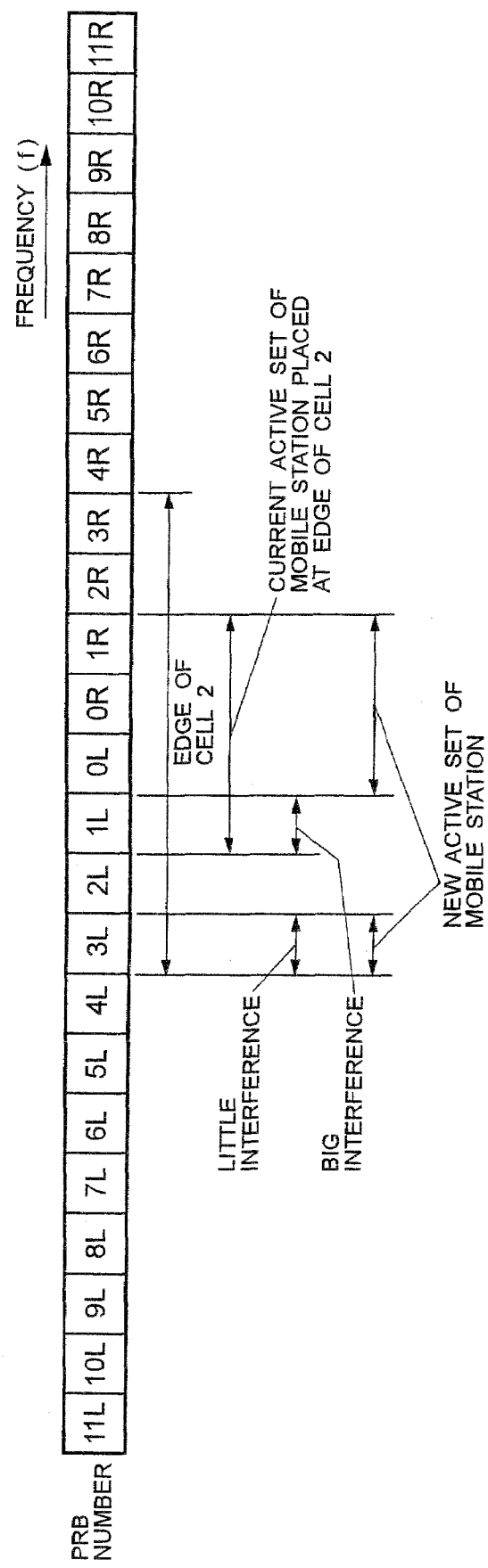
FIG. 8 is a diagram showing an example of changing an active set of PRBs by the mobile station supporting in another embodiment of the present invention.

FIG. 8 is a diagram showing a general concept of changing an active set based on the mobile station supporting active set management. The current active set of the PRBs for the mobile station placed at the edge of the cell 2 is 0L to 1L and 0R to 1R, which is in the range of the active set allocated to the edge of the cell 2 shown in FIG. 3.

It is assumed that the mobile station measures an interference level of the PRB forming the current active set and an interference level of the PRB that falls in the active set of the edge of the cell 2 and forms an active set other than the current active set in this state. As a result of the measurement, it is assumed that the interference level of PRB 1L is higher than the interference level of those other than the current active set and the interference level of PRB 3L is lower than the average interference level in the current active set. In this case, the mobile station requests (recommends) the base station to add the PRB 3L to the current active set and delete the PRB 1L from the current active set. The base station adds the PRB 3L and deletes the PRB 1L based on the requirement.

The base station examines the recommendation from the mobile station with reference to the rule of the abovementioned frequency planning. In the example, since the PRB 3L which is recommended to add to the current active set meets the rule of the frequency planning, the recommendation from the mobile station is accepted. If the recommendation from the mobile station does not meet the rule of the frequency planning, the base station rejects the recommendation from the mobile station. As a result of accepting the recommendation, an active set of the new PRB for the mobile station is 0L, 3L and 0R to 1R.

If the CQI is the interference level, the base station can recognize that the interference of the PRB 1L increases from the CQI information on the active set from the mobile station. The base station can delete the PRB 1L from the active set even without a request for deleting the PRB 1L from the mobile station.

In order to improve the effect of the mobile station supporting active set management, the mobile station may define a monitoring set" that can recommend an additional PRB, i.e., a set consisting of PRBs in a predetermined range. That is to say, it may be adapted such that the mobile station can request to add a PRB in the monitoring set to the active set, but cannot request to add a PRB in other than the monitoring set to the active set.

In the example of FIG. 8, if the mobile station requests to add the PRB that is not permitted to be used at the edge of the cell 2 (that is to say, each PRB at the left of the PRB 3L and each PRB at the right of the PRB 3R), the base station rejects the request for adding the PRB. If the mobile station keeps on requesting for adding the PRBs that are forbidden to be used for the mobile station, the base station keeps rejecting the request for adding the PRBs from the mobile station. In this case, since the PRBs between the PRB 3L and 3R are defined as the monitoring set for the mobile station, the abovementioned state in which endless requests and rejections are kept can be eliminated.

The example of FIG. 8 is merely an example of a criterion (changing rule) for determining a request for adding PRB and a request for deleting PRB, and other changing rules for an active set to be exemplified below may be used.

(1) If a PRB other than that in the current active set has an interference level lower than the level lower than the maximum interference level in the active set by a predetermined level for a predetermined period, the mobile station requests to add the PRB to the active set.

(2) If a PRB other than that in the current active set has an interference level lower than the level lower than the average interference level in the active set by a predetermined level for a predetermined period, the mobile station requests to add the PRB to the active set.

(3) If a PRB other than that in the current active set has a SIR level that is higher than the SIR level lower than the maximum SIR level of the active set by a predetermined level for a predetermined period, the mobile station requests to add the PRB to the active set.

(4) If a PRB other than that in the current active set has a SIR level that is higher than the SIR level lower than the average SIR level of the active set by a predetermined level for a predetermined period, the mobile station requests to add the PRB to the active set.

(5) If a PRB other than that in the current active set has an interference level lower than a predetermined interference level for a predetermined period, the mobile station requests to add the PRB to the active set.

(6) If a PRB other than that in the current active set has a SIR level higher than a predetermined SIR level for a predetermined period, the mobile station requests to add the PRB to the active set.

The abovementioned rules (1) to (6) are adding rules. Deleting rules will be shown next.

(7) If a PRB in the current active set has an interference level higher than the level lower than the maximum interference level in the active set by a predetermined level for a predetermined period, the mobile station requests to delete the PRB from the active set.

(8) If a PRB in the current active set has an interference level higher than the level lower than the average interference level in the active set by a predetermined level for a predetermined period, the mobile station requests to delete the PRB from the active set.

(9) If a PRB in the current active set has a SIR level lower than a SIR level lower than the maximum SIR level in the active set by a predetermined level for a predetermined period, the mobile station requests to delete the PRB from the active set.

(10) If a PRB in the current active set has a SIR level lower than a SIR level lower than the average SIR level in the active set by a predetermined level for a predetermined period, the mobile station requests to delete the PRB from the active set.

(11) If a PRB in the current active set has an interference level higher than a predetermined interference level for a predetermined period, the mobile station requests to delete the PRB from the active set.

(12) If a PRB in the current active set has a SIR level lower than a predetermined SIR level for a predetermined period, the mobile station requests to delete the PRB from the active set.

It is apparent that the mobile station may transmit a request to substitute PRBs (replace) to the base station by combining the above-mentioned adding rules (1) to (6) and deleting rules (7) to (12) appropriately.

Figure 9:
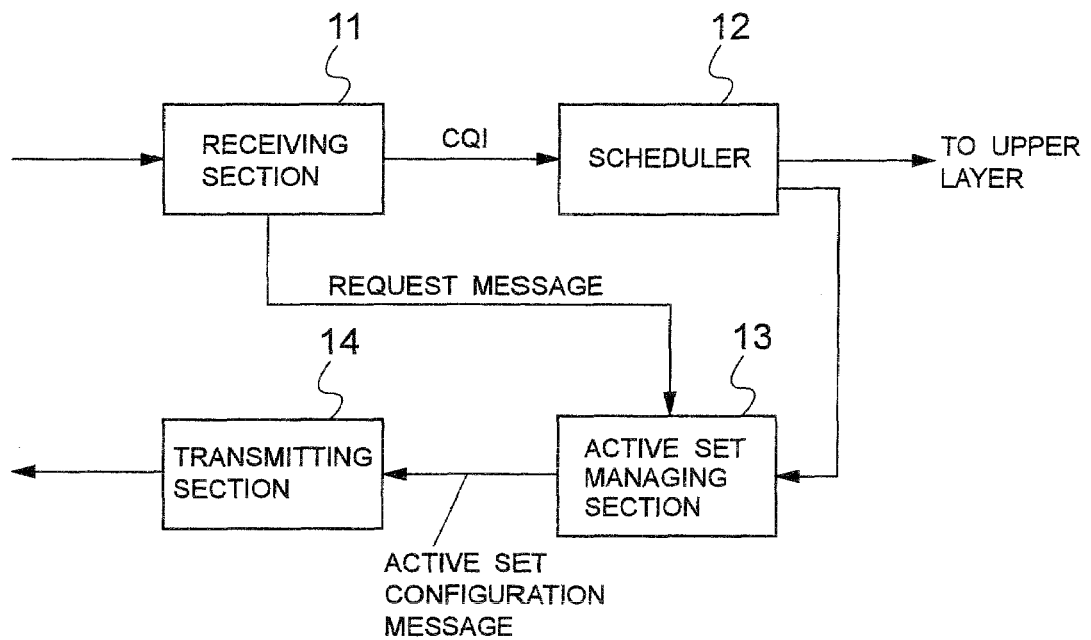
FIG. 9 is an outlined block diagram of the base station in anther embodiment of the present invention.

FIG. 9 is a block diagram of outlined functions of the base station for performing the mobile station supporting active set management. The parts same as those in FIG. 4 are denoted by the same reference numerals. In the example, that a request message from the mobile station is supplied from the receiving section 11 to the active set managing section 13 is added to the blocks of FIG. 4. The active set managing section 13 updates the active set based on the request message and transmits an active set configuration message to the mobile station.

Figure 10:
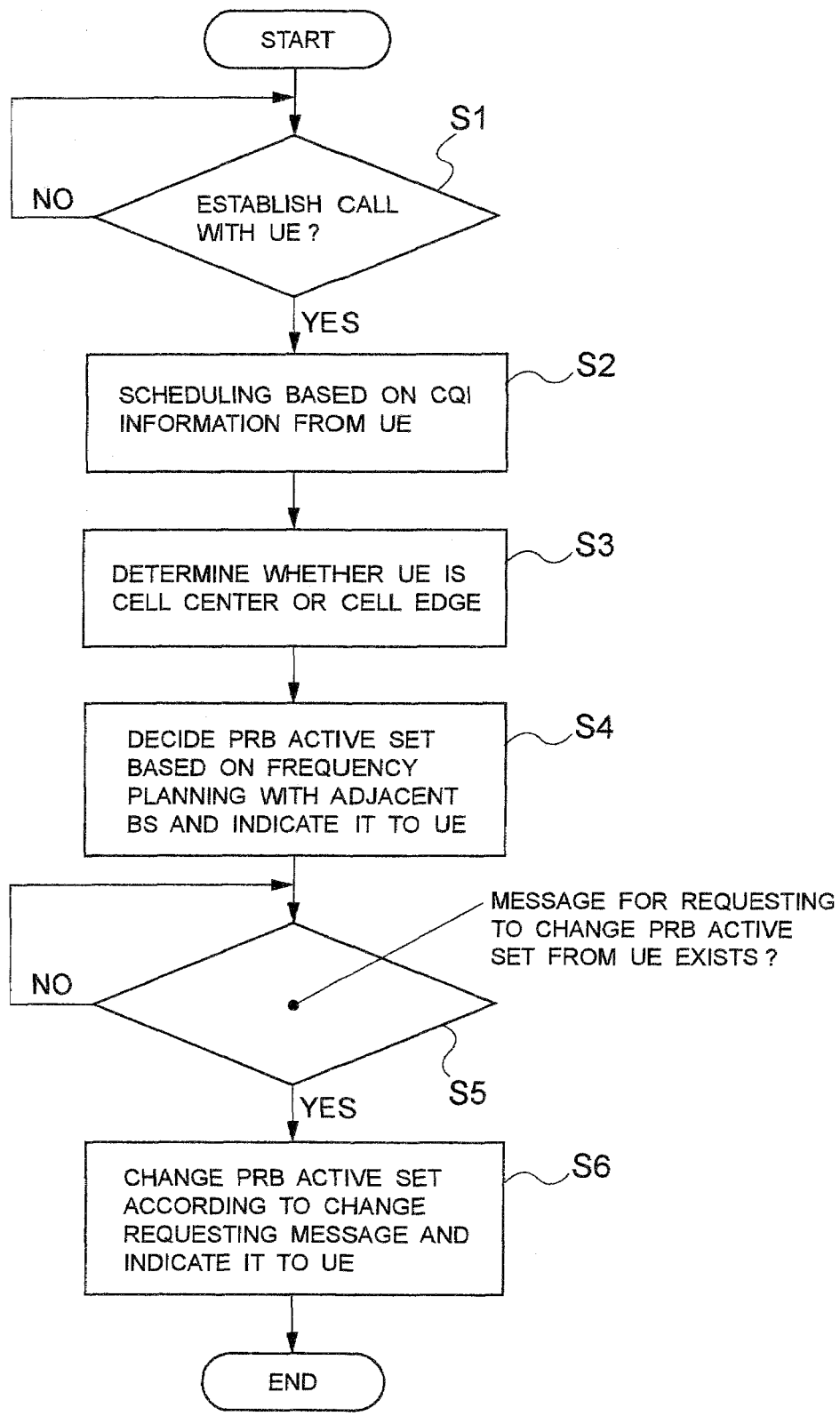
FIG. 10 is a flowchart showing operations of the base station in another embodiment of the present invention.

FIG. 10 is a flowchart showing operations of the base station, in which the steps same as those in FIG. 5 are denoted by the same reference numerals. In the embodiment, whether a message for requesting to change the PRB active set comes from the mobile station or not is determined after the step S4 (step S5). If so, the base station changes the active set of the PRB based on the message and indicates the changed active set to the mobile station according to the requesting message (step S6). Operations at the steps S4, 5 are performed in the active set managing section 13 in FIG. 9.

The active set managing section 13 receives information on a CQI from the mobile station and decides the PRB that can be deleted from the PRBs in the current active set that is allocated to the mobile station. The decision rule of deletion in such a case includes examples below.

(13) If CPICH of a PRB in the current active set is at the level (X) lower than the level lower than the maximum CPICH (Z) in the active set by a predetermined level (Y) (X<Z−Y), the PRB can be deleted from the active set.

(14) If the best cell is to be changed, the current active set is changed based on the frequency planning between the adjacent base stations (cells) that is described in FIGS. 2 and 3.

The mobile station may inform a message as shown below to the base station instead of generating the abovementioned request to change the active set and transmitting it to the base station.

(15) If no more PRB that has an interference level lower than the interference level of each PRB of the current active set is present for a predetermined period, a message that the current active set is optimum is informed of.

(16) If no more PRB that has a SIR level higher than a SIR level of each PRB of the current active set is present for a predetermined period, a message that the current active set is optimum is informed of.

It is assumed that the number of the PRBs for forming the active set of PRBs is to be adjusted by deletion/addition in the range between the minimum value and the maximum value that are defined in advance at the base station.

Figure 11:
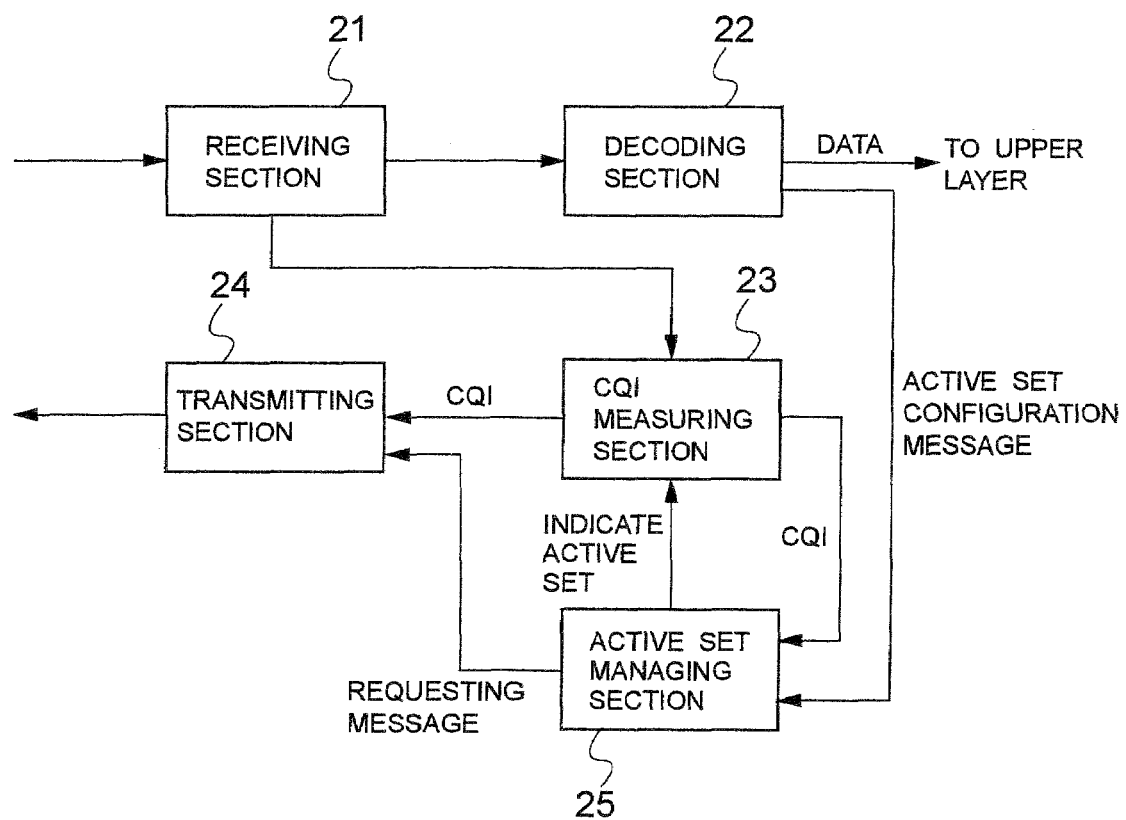
FIG. 11 is an outlined block diagram of the mobile station in another embodiment of the present invention.

FIG. 11 is a block diagram of outlined functions of the mobile station for performing the mobile station supporting active set management, in which the parts same as those in FIG. 6 are denoted by the same reference numerals. In the example, an active set managing section 25 is added to the blocks of FIG. 6. The active set configuration message from the decoding section 22 is supplied to the CQI measuring section 23 via the active set managing section 25, and the CQI by the CQI measuring section 23 is supplied to the active set managing section 25. The active set managing section 25 outputs a message for requesting to change the PRB to the transmitting section 24.

Figure 12:
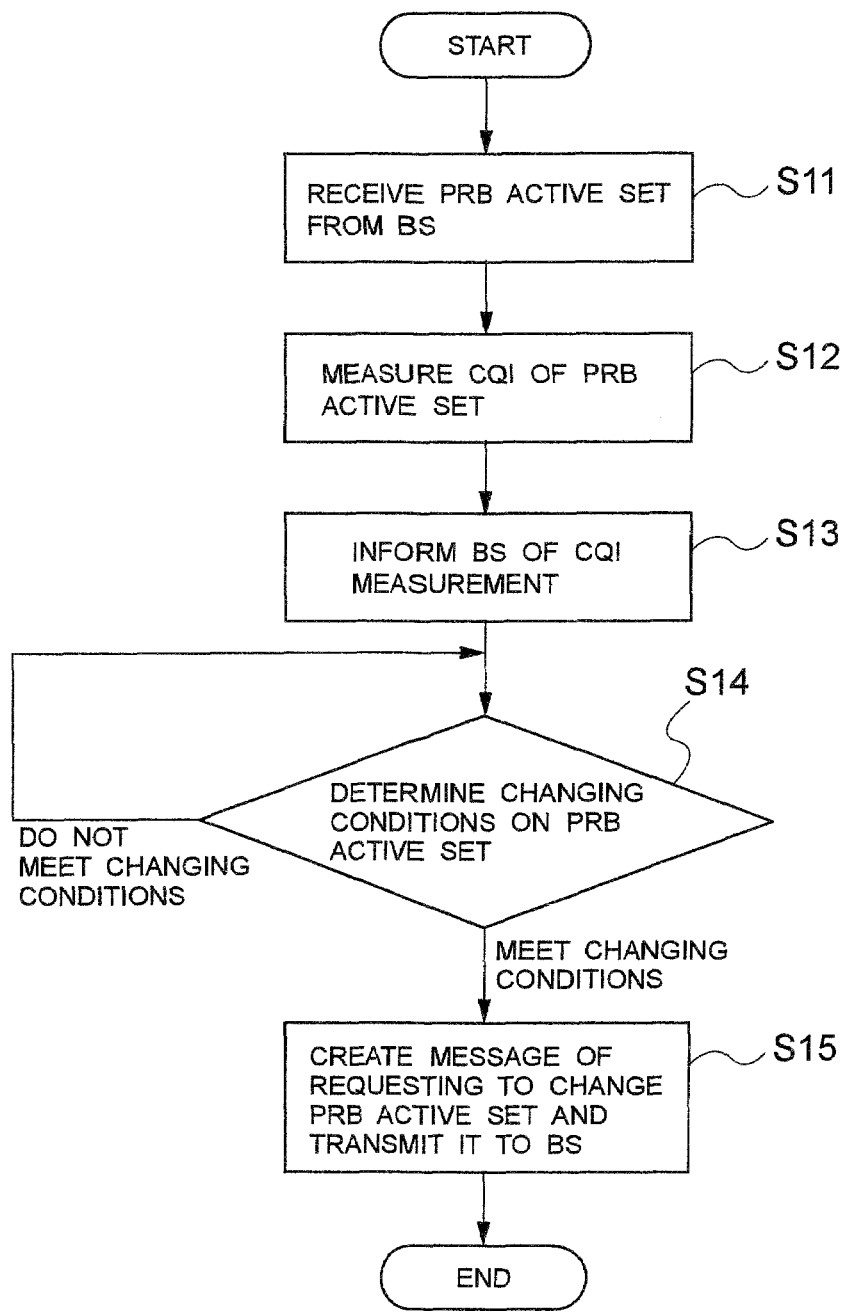
FIG. 12 is a flowchart showing operations of the mobile station in another embodiment of the present invention.
Figure 13:
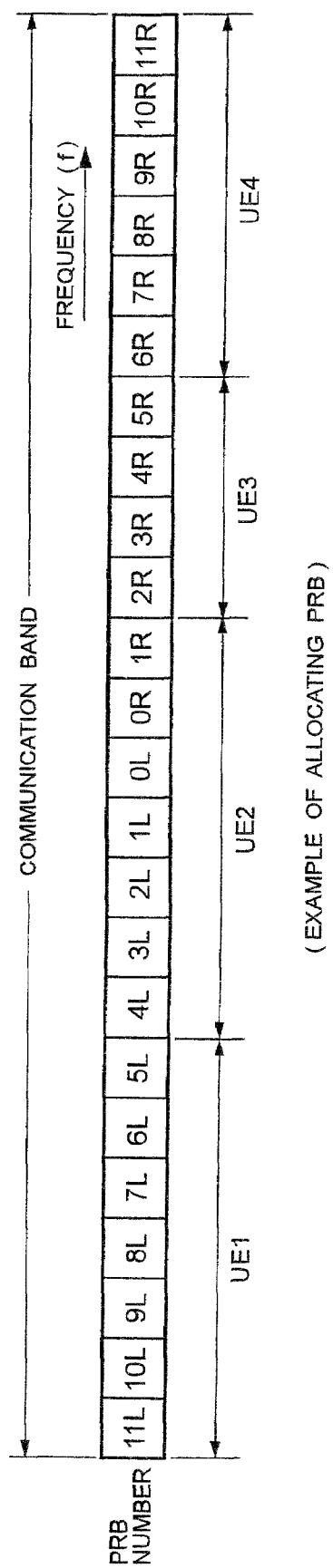
FIG. 13 is a diagram for illustrating the PRB.

FIG. 12 is a flowchart showing operations of the mobile station of FIG. 11, in which the same steps as those in FIG. 7 are denoted by the same reference numerals. Following to the step 13 in FIG. 7, determination on changing conditions of the active set of the PRB is performed (step S14). The determination on the changing conditions is performed based on the abovementioned changing (adding) rules (1) to (6). If the changing conditions are met, a message for requesting to change the active set is created and transmitted to the base station (step S15). The steps 14 and 15 are performed at the active set managing section 25.

As the CQI in each of the above-mentioned embodiments, a SNR (Signal to Noise Ratio), a SNIR (Signal to Noise & Interference Ratio), an interference level, a pass-loss, etc., can be considered. Although the interference level and the SIR level are used as an indicator to be used as a criteria (changing rule) for determining the adding request/deleting request of the above-mentioned active set, the interference level and the SIR level are indicators which are reverse to each other. That is to say, if the interference level is low, the CQI is good, and if the SIR level is high, the CQI is good. Therefore, the indicators can be substituted by each other as high and low of the above-mentioned changing rules are reversed.

In each of the abovementioned embodiments, the present invention is applied to the mobile communication system in the OFDM method, though, it is not limited to the OFDM method. The present invention can be applied to the FDM (Frequency Division Multiplexing) method, a method combining the FDM and TDM (Time Division Multiplexing) or a method combining the FDM, TDM and CDM (Code Division Multiplexing).

It is a matter of course that it can be adapted to store the abovementioned operations of the base station and the mobile station in the form of the operation procedures in a recording medium such as a ROM and case a computer to read and execute them.

According to the present invention, the mobile station only needs to inform on a CQI for each PRB forming the active set of PRBs (the set consisting of PRBs which are selected by a base station and whose CQIs are requested to be informed of by the base station) and needs not to inform CQIs for all the PRBs. Therefore, the present invention has an advantage in reducing a load on the mobile station which also enables uplink overhead to be reduced. Further, the present invention can improve efficiency of a scheduler by changing a PRB that forms an active set at a base station based on a request from a mobile station for changing the PRB that forms the active set.

What is claimed is:

1. A communication system comprising:
a mobile station which measures a communication channel quality of a wireless band obtained by dividing a downlink communication band into a plurality of wireless bands and informs a base station of the measurement via an uplink,
wherein said base station comprises:
a set managing unit that allocates a set comprising at least one wireless band whose quality is to be measured by said mobile station and sends, to said mobile station, a message which includes said at least one wireless band;
wherein said set managing unit is adapted to allocate to said mobile station a different set of one or more wireless bands to be measured by said mobile station, based on a request from said mobile station to add or delete one or more wireless bands from said set; and
wherein said mobile station comprises:
a requesting unit that requests to add a wireless band not included in the current set to said current set, upon an interference level of the wireless band being lower by a predetermined level than a maximum interference level or an average interference level in the current set.

2. The communication system according to claim 1, wherein said mobile station comprises:
a measurement unit that measures a communication channel quality of each wireless band that forms said set and informs said base station of the measurement.

3. The communication system according to claim 1, wherein said set managing unit that manages a wireless band that forms said set based on predetermined frequency planning between adjacent base stations.

4. The communication system according to claim 1, wherein said mobile station comprises:
a requesting unit that requests to add a wireless band not included in the current set to said current set, upon an interference level of the wireless band being lower than an average interference level in said current set.

5. The communication system according to claim 1, wherein said mobile station comprises:
a requesting unit that requests to add a wireless band not included in the current set to said current set, upon a SIR level of the wireless band being higher by a predetermined level than a level that is lower than a maximum SIR level or an average SIR level in said current set.

6. The communication system according to claim 1, wherein said mobile station comprises:
a requesting unit that requests to add a wireless band not included in the current set to said current set, upon an interference level (or a SIR level) of the wireless band being lower (or higher) than a predetermined interference level (or a predetermined SIR level).

7. The communication system according to claim 4, wherein a wireless band that can be requested to be added to said set is a wireless band within a predetermined range.

8. The communication system according to claim 1, wherein said mobile station comprises:
a requesting unit that requests to delete a wireless band in the current set from said current set, upon an interference level of the wireless band being higher than the interference level other than said current set.

9. The communication system according to claim 1, wherein said mobile station comprises:
a requesting unit that requests to delete a wireless band in the current set from said current set, upon an interference level of the wireless band being higher by a predetermined level than a level that is lower than a maximum interference level or an average interference level in said current set.

10. The communication system according to claim 1, wherein said mobile station comprises:
a requesting unit that requests to delete a wireless band in the current set from said current set, upon a SIR level of the wireless band being lower by a predetermined level than a level that is lower than a maximum SIR level or an average SIR level in said current set.

11. The communication system according to claim 1, wherein the mobile station comprises:
a requesting unit that requests to delete a wireless band in the current set from said current set, upon an interference level (or a SIR level) of the wireless band being higher (or lower) than a predetermined interference level (or a predetermined SIR level).

12. The communication system according to claim 1, wherein said set managing unit deletes a wireless band in the current set from said current set, upon a pilot signal of the wireless band being lower by a predetermined level than the maximum pilot signal in said current set.

13. A communication method in which a mobile station measures a communication channel quality of a wireless band obtained by dividing a downlink communication band into a plurality of wireless bands and informs a base station of the measurement via an uplink, comprising:
in said base station, allocating a set comprising at least one wireless band whose quality is to be measured by said mobile station;
sending, to said mobile station, a message which includes said at least one wireless band;
allocating to said mobile station a different set of one or more wireless bands to be measured by said mobile station based on a request from said mobile station to add or delete one or more wireless bands from said set; and
in said mobile station, requesting to add a wireless band other than the plurality of wireless bands forming the current set to said current set, upon an interference level of the wireless band being lower by a predetermined level than a level that is lower than a maximum interference level or an average interference level in said current set.

14. The communication method according to claim 13, further comprising:
in said mobile station,
measuring a communication channel quality of each wireless band that forms said set and informing said base station on the measurement.

15. The communication method according to claim 13, wherein said set managing step manages a wireless band that forms said set based on predetermined frequency planning between adjacent base stations.

16. The communication method according to claim 13, further comprising:
in said mobile station,
requesting to add a wireless band not included in the current set to said current set, upon an interference level of the wireless band being lower than an average interference level in said current set.

17. The communication method according to claim 13, further comprising:
in said mobile station,
requesting to add a wireless band not included in the current set to said current set, upon a SIR level of the wireless band being higher by a predetermined level than a level that is lower than a maximum SIR level or an average SIR level in said current set.

18. The communication method according to claim 13, further comprising:
in said mobile station,
requesting to add a wireless band not included in the current set to said current set, upon an interference level (or a SIR level) of the wireless band being lower (or higher) than a predetermined interference level (or a predetermined SIR level).

19. The communication method according to claim 13, wherein a wireless band that can be requested to be added to said set is a wireless band within a predetermined range.

20. The communication method according to claim 13, further comprising:
in said mobile station,
requesting to delete a wireless band in the current set from said current set, upon an interference level of the wireless band being higher than the interference level other than said current set.

21. The communication method according to claim 13, further comprising:
in said mobile station,
requesting to delete a wireless band in the current set from said current set, upon an interference level of the wireless band being higher by a predetermined level than a level that is lower than a maximum interference level or an average interference level in said current set.

22. The communication method according to claim 13, further comprising:
in said mobile station,
requesting to delete a wireless band in the current set from said current set, upon a SIR level of the wireless band being lower by a predetermined level than a level that is lower than a maximum SIR level or an average SIR level in said current set.

23. The communication method according to claim 13, further comprising:
in the mobile station,
requesting to delete a wireless band in the current set from said current set, upon an interference level (or a SIR level) of the wireless band being higher (or lower) than a predetermined interference level (or a predetermined SIR level).

24. The communication method according to claim 13, wherein said set managing step deletes a wireless band in the current set from said current set, upon a pilot signal of the wireless band being at a lower level than the level lower than the maximum pilot signal in said current set by a predetermined level.

25. A base station which is used in a mobile communication system in which a mobile station measures a communication channel quality of a wireless band obtained by dividing a downlink communication band into a plurality of wireless bands and informs said base station of the measurement via an uplink, comprising:
a receiving unit that receives said measurement, and a set managing unit that allocates a set comprising at least one wireless band whose quality is to be measured by said mobile station and sends, to said mobile station, a message which includes said at least one wireless band;
wherein said set managing unit is adapted to allocate to said mobile station a different set of one or more wireless bands to be measured by said mobile station, based on a request from said mobile station to add or delete one or more wireless bands from said set; and wherein said set managing unit is adapted to add a wireless band not in the current set to said current set, upon a pilot signal of said current wireless band being lower by a predetermined level than a level that is lower than the maximum pilot signal in said current set.

26. The base station according to claim 25, wherein said set managing unit manages a wireless band that forms said set based on predetermined frequency planning between adjacent base stations.

27. The base station according to claim 25, wherein said set managing unit deletes a wireless band in the current set from said current set, upon a pilot signal of said current wireless band being lower by a predetermined level than a level that is lower than the maximum pilot signal in said current set.

28. A mobile station for measuring a communication channel quality of a wireless band obtained by dividing a downlink communication band into a plurality of wireless bands and informing a base station of the measurement via an uplink, comprising:
a measurement unit that measures the communication channel quality of at least one of said wireless bands whose channel quality is to be reported by said mobile station to the base station and that sends the base station a request to add or delete one or more wireless bands from a set of wireless bands whose channel quality is to be measured, based on a channel quality for said at least one of said wireless bands;
a managing unit adapted to be allocated a different set of one or more wireless bands to measure; and
a requesting unit that requests the base station to add a wireless band not included in the current set to said current set, upon an interference level of the wireless band being lower by a predetermined level than a maximum interference level or an average interference level in the current set.

29. The mobile station according to claim 28, comprising:
a requesting unit that requests the base station to add a wireless band not included in the current set to said current set, upon an interference level of the wireless band having an interference level lower than an average interference level in said current set.

30. The mobile station according to claim 28, comprising:
a requesting unit that requests the base station to add a wireless band not included in the current set to said current set, upon a SIR level of the wireless band being higher by a predetermined level than a level that is lower than a maximum SIR level or an average SIR level in said current set.

31. The mobile station according to claim 28, comprising:
a requesting unit that requests the base station to add a wireless band not included in the current set to said current set, upon an interference level (or a SIR level) of the wireless band being lower (or higher) than a predetermined interference level (or a predetermined SIR level).

32. The mobile station according to claim 29, wherein a wireless band that can be requested to be added to said current set is a wireless band within a predetermined range.

33. The mobile station according to claim 28, comprising:
a requesting unit that requests the base station to delete a wireless band in the current set from said current set, upon an interference level of the wireless band being higher than the interference level other than said current set.

34. The mobile station according to claim 28, comprising:
a requesting unit that requests the base station to delete a wireless band in the current set from said current set, upon an interference level of the wireless band being higher by a predetermined level than a level that is lower than a maximum interference level or an average interference level in said current set.

35. The mobile station according to claim 28, comprising:
a requesting unit that requests the base station to delete a wireless band in the current set from said current set, upon a SIR level of the wireless band being lower by a predetermined level than a level that is lower than a maximum SIR level or an average SIR level in said current set.

36. The mobile station according to claim 28, comprising:
a requesting unit that requests to delete a wireless band in the current set from said current set, upon an interference level (or a SIR level) of the wireless band being higher (or lower) than a predetermined interference level (or a predetermined SIR level).

37. A program embodied on a non-transitory computer readable medium for causing a computer to execute operations of a base station which is used in a mobile communication system in which a mobile station measures a communication channel quality of a wireless band obtained by dividing a downlink communication band into a plurality of wireless bands and informs said base station of the measurement via an uplink, said operations comprising:
receiving said measurement;
allocating a set which comprises at least one wireless band whose quality is to be measured by said mobile station;
sending, to said mobile station, a message which includes said at least one wireless band;
allocating to said mobile station a different set of one or more wireless bands to be measured by said mobile station based on a request from said mobile station to add or delete one or more wireless bands from said set; and
adding a wireless band not included in the current set to said current set, upon a pilot signal of said current wireless band being lower by a predetermined level than a level that is lower than the maximum pilot signal in said current set.

\* \* \* \* \*